Sheet 1 - 3 Sheets

H. A. Wells.

Forming Bats.

No. 1086 Reissued Dec. 4, 1860.

Witnesses:
Wm. H. Bishop
Geo. H. Shaw

Assignee:
H. A. Lunn

H. A. Wells.

Forming Bats.

No 1086 Reissued Dec. 4, 1860.

Witnesses:

Assignor

H. A. Wells.

Forming Bats.

No. 1086

Reissued Dec. 4, 1860.

Witnesses:

Assignee.

H. A. Wells

UNITED STATES PATENT OFFICE.

HENRY A. BURR, OF NEW YORK, N. Y., ASSIGNEE OF ELIZA WELLS, ADMINISTRATRIX OF H. A. WELLS, DECEASED.

IMPROVEMENT IN MANUFACTURING HAT-BODIES.

Specification forming part of Letters Patent No. 4,472, dated April 25, 1846; Reissue No. 400, dated October 7, 1856; extended seven years; Reissue No. 1,086, dated December 4, 1860.

DIVISION B.

*To all whom it may concern:*

Be it known that HENRY A. WELLS, late of the city, county, and State of New York, now deceased, did, in his life-time, invent certain new and useful Improvements in the Process of Making Hat-Bodies of Fur, for which said improvements, in connection with machinery for forming the bats, Letters Patent of the United States were granted to the said WELLS, bearing date the 25th day of April, 1846; and I do hereby declare that the following is a full, clear, and exact description of the principle or character which distinguishes the said invention from all other things before known, and of the manner of working the same, reference being had to the accompanying drawings, making part of this description, in which—

Figure 1:
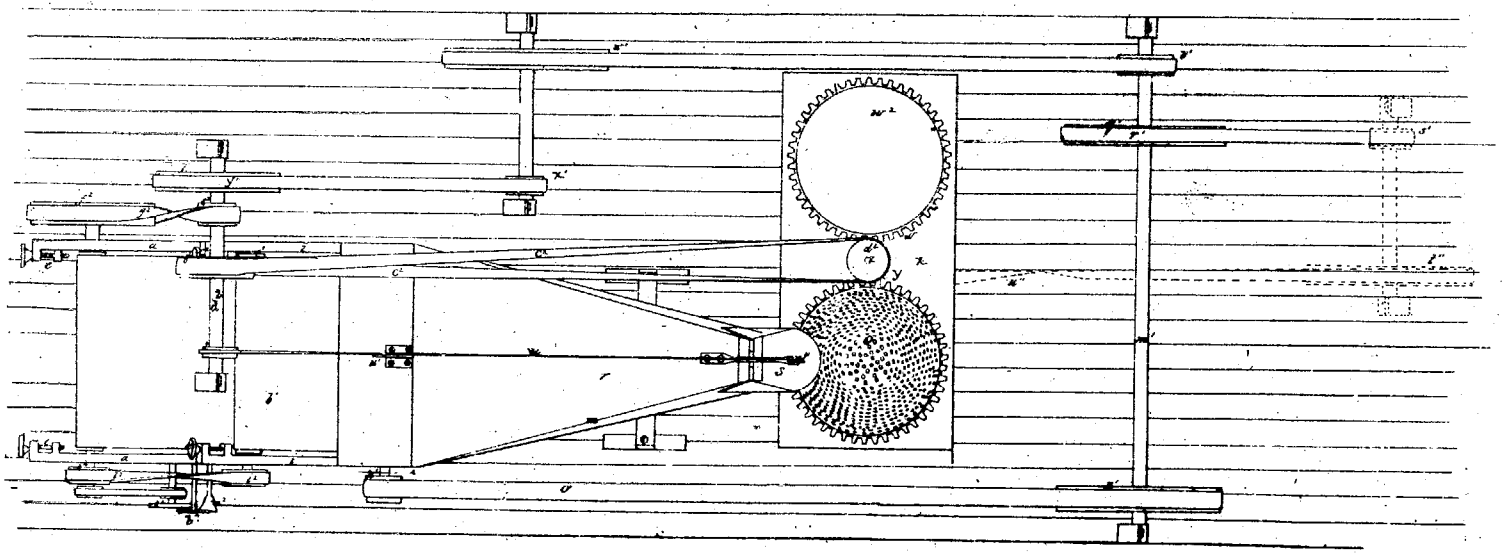
Figure 2:
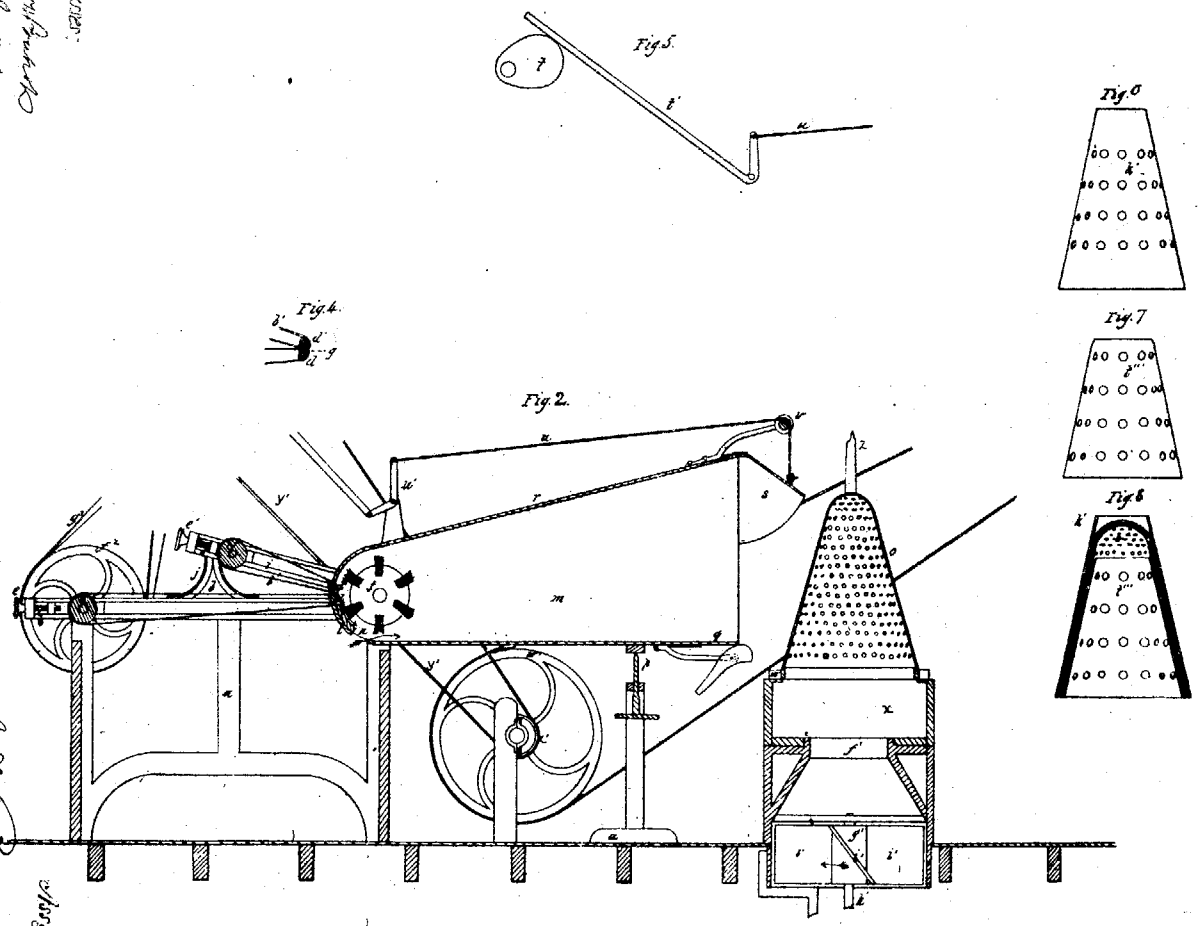
Figure 3:
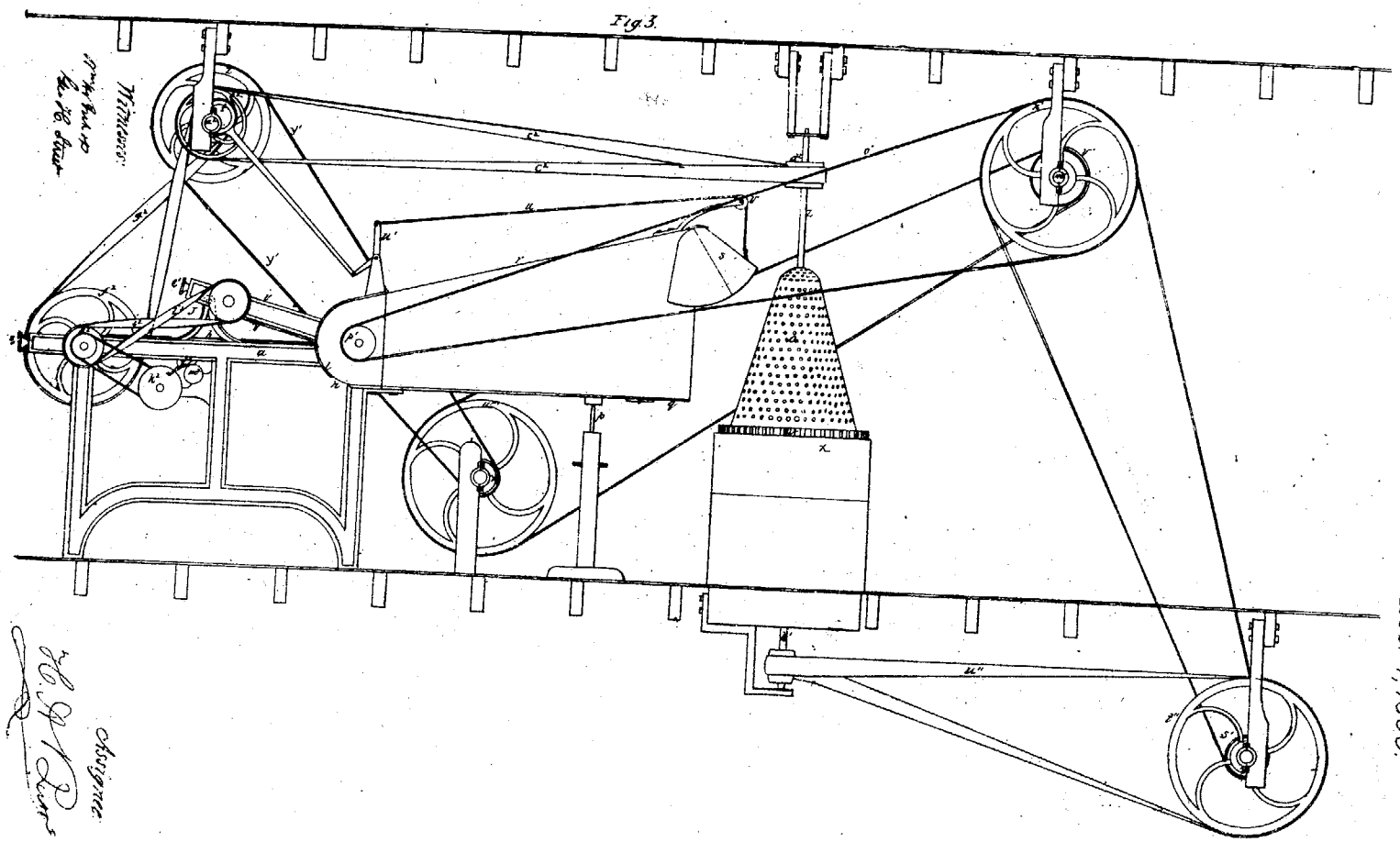

Figure 1 is a plan of the machine; Fig. 2, a longitudinal vertical section, and Fig. 3 a longitudinal elevation. The other figures will be described in their appropriate places.

The same letters indicate like parts in all the figures.

Prior to the invention of the said HENRY A. WELLS fur hat-bodies were made by what is known as the "bowing process," by which two flat bats were separately formed and then united at the edges, and then hardened and felted, and although attempts had been made to avoid the difficulties presented by this process such attempts were not successful, so that at the date of the said invention of the said WELLS the bowing process was the only one practically used in the manufacture of fur hat-bodies.

By the invention of the said HENRY A. WELLS fur hat-bodies are made directly of the required form and in a suitable condition for the after process of sizing by felting; and the said invention consists in effecting this result by the combination of two consecutive processes, the first of which is to form a bat of fur fibers of the required thickness by depositing the fur onto the surface of a pervious cone or former connected with an exhausting apparatus to exhaust the air from the inside thereof, that the fur fibers so deposited may be held thereon by the pressure of the surrounding air, and the second of which processes is to harden the bat of fur fibers so formed while on the said pervious cone or former by partially felting the same while on such cone or former, to give it the required consistency to admit of taking it off in a suitable condition for the after and usual process of sizing by felting. By means of this combination of processes fur hat bodies can be made directly of the form and of any varying thickness required.

The following is a description of the means suitable for applying the said combined process to practice, although other and equivalent means may be employed for working the combined process invented by the said WELLS.

Having thus pointed out the principle or character of the said invention of the said H. A. WELLS, the special mode of application will be next described.

The first branch of the said process may be worked by means of a machine represented in the accompanying drawings, and which is believed to be the best means, although other and equivalent means may be employed for the purpose, and no claim is herein made to the machinery described, as that is claimed in another patent.

In the accompanying drawings, *a* represents a frame properly adapted to the operative parts of the machine, and *b* the lower feed-apron, on which the stock or fur is spread by the attendant, in separate parcels, each sufficient for the formation of a hat according to its intended weight. This apron or endless belt of cloth, or other suitable material, passes around a roller, *c*, and a lip, *d*, the former at the back of the machine, with its bearings in sliding boxes governed by set-screws *e e*, for the purpose of tightening this apron, and the latter near to the rotating picking-brush *f*, and so formed as to present a slightly-rounded edge to the apron to pass over where it presents the fur to the action of the picking-brush. Instead of this slightly-rounded edge, a small metallic roller may be substituted, but when this is done the roller should be supported at different points between its end journals by letting it run in a circular groove in the lip, as represented in section at Fig. 4, where *g* indicates this roller. The fur, as it is carried along toward the lip $d$, is gradually compressed by the upper apron, $b'$, which passes around a feed-apron, $c'$, and a lip, $d'$, in manner similar to the under feed-apron. The roller $c'$ runs in a frame, $i$, of which the lip $d'$ forms part, hung on journals that rest in standards $j$, so that the lip $d'$ can be made to press onto the fur between it and the under lip, $d$, and thus grip the fibers and present them to the effective action of the picking-brush $f$. The under plane of the upper apron, $b'$, is inclined to the upper plane of the lower one, $b$, the more effectually to present the fibers in the proper manner to the picking-brush. The roller $c'$ of the upper apron runs in sliding boxes, governed by set-screws $e'$ $e'$, and is placed forward of the journals of the frame, so that the tension of the belt $i^2$, which communicates motion from the lower roller, $c$, to the upper one, $c'$, may press the upper lip, $d'$, on the under lip, $d$; but this may be effected by means of springs, weights, or other well-known mechanical devices for making pressure under similar circumstances.

The fibers, as they pass from the feed-aprons, are acted upon by a brush, $f$, that rotates with great velocity, and which is composed of parallel rows of stiff bristles projecting from a cylinder, but which may be differently constructed and composed, if desired. As the fibers are first presented they are brushed and properly laid by the downward action of the brush, as indicated by the arrow, and when liberated are carried down the curved surface $l$ of a chamber or tunnel, $m$, and at the lower edge of this they meet a current of air that enters a narrow aperture, $n$, near the bottom of the chamber and extending the whole length of the picking-brush, which, being induced by the rotation of the picking-brush and the partial vacuum in the perforated cone $o$, aids in carrying and giving direction to the fur-bearing current toward the surface of the perforated cone $o$. This chamber extends over and under the picking-brush and the forward part of the lips, and turns on the journals of the brush, or is otherwise so arranged as to have a slight motion, the axis of which is the same as that of the brush. Its bottom rests on a set-screw, $p$, to regulate the delivery end of the fur at or near the base of the cone. Its forward end, in addition to this, is provided with a hinged hood, $q$, regulated by a cam-lever, or other suitable means, to regulate the delivery of the fibers at and near the base of the cone. The top $r$ of this trunk is gradually elevated, and its sides are contracted to make the delivery-aperture nearly of the form of the cone, but narrower and higher, and its upper part is provided with a hood, $s$, so curved as to correspond generally with the curve of the lip of the cone. This hood is hinged to the upper part of the delivery-aperture of the chamber, and is connected with an eccentric, $t$, by means of a cord, $u$, that passes over a pulley, $v$, which cord is attached to a bell-crank, $w'$, so that each revolution of this eccentric carries the hood up and down to direct the discharge and distribute the fibers onto the cone, a greater thickness being desirable in the parts of the bat which form the brim than on the tip and crown, and when it is desired still further to diversify the distribution of the fibers other means can be substituted for the eccentric, and the connection between it and the deflector is formed as represented in section at Fig. 5, where the cam $t$ acts on the lever $t'$, connected by the cord $u$.

The cone $o$ is made in the usual manner, but of thin sheet metal, perforated, that being deemed better than wire guaze. Its lower edge fits in a metallic ring, $w$, that runs in an appropriate collar in the upper part of a case, $x$, and its outer periphery is provided with cogs that mesh into the cogs of a pinion, $y$, concealed in the drawings by the pulley $d^2$ on a vertical shaft, $z$, by which a slow rotary motion is given to the cone as the fibers are thrown onto it, to distribute them equally all around the cone. The case $x$ may be made sufficiently long to receive two rings, $w$—one on each side of the pinion $y$—by which both are kept in motion, and it (the case) may be made to swivel on a hollow collar, $f'$, to which its bottom is fitted, so that when one cone is covered it may be turned aside by turning the case half a revolution and another cone put onto the other ring, that another bat may be in the process of forming, while the one already formed may be prepared for the hardening process in the manner to be hereinafter described.

The case $x$ communicates, through the hollow collar $f'$, with an exhausting-fan blower, $g'$, which consists of a vertical arbor, $h'$, with oblique vanes $i'$, so that when rotating with great velocity in the direction of the arrow, the air is exhausted from the case $x$ and the inside of the perforated cone $o$. When one of the cones is removed from one of the rings $w$, to be taken to the hardening apparatus, the aperture in the ring $w$ must be closed up with a cap-plate, $w^2$, to prevent the passage of air. Any other mode of exhausting the case and cone may be employed, but this is deemed the best.

All the operative parts may be set in motion by any of the known means—such as belts—as fully represented in the accompanying drawings, in which $m'$ is a main line-shaft overhead, driven by any first mover. From a wheel, $n'$, on it a band, $o'$, extends to a pulley, $p'$, on the shaft of the brush, which should make about two thousand revolutions per minute, more or less. From another wheel, $q'$, on this same shaft, a band, $r'$, extends to a pulley, $s'$, on the shaft of which there is a wheel, $t''$, that drives the exhaust-fan $g'$ by the belt $u''$, and from a pulley, $v'$, on the same line-shaft, a belt extends to a wheel, $w'$, on the shaft of which there is a pulley, $x'$, from which extends another belt, $y'$, to a wheel, $z'$, on the shaft $a^2$, that carries the eccentric $t$, to give all the reduced motions required for the other parts of the machinery. From a wheel, $b^2$, on this shaft a belt, $c^2$, extends to a pulley, $d^2$, on the shaft $z$ that rotates the cone $o$, and another pulley, $e^2$, drives the wheel $f^2$ of the feed-roller $c$ by the belt $g^2$, and on the other end of the axle of this feed-roller there is a pulley, $h^2$, which drives, by a cross-belt, $i^2$, the upper feed-roller, $c'$. If desired, an alarm can be connected with the feed-roller of the lower apron to announce to the attendant when each charge of stock is exhausted, that the cones may be shifted. This can be done by connecting the arbor of the feed-roller $c$ of the lower feed-apron by a belt with a wheel, $k^2$, provided with a cam or pin, to lift, at every revolution, the hammer $l^2$ of a bell, $m^2$, the striking of which shall give requisite indication.

The fibers constituting the bat formed by the deposit of fur fibers, whether by the machinery herein described, but not claimed herein, or by any equivalent means—such as the Fosket machine—are only held together by the pressure of the surrounding air, induced by exhausting the air from the inside of the pervious cone, and before the bat can be removed it must be partially felted, termed "hardened," to give it the required consistency to admit of handling; and it will be obvious that this partial felting of the bat cannot be performed on the cone by any of the known processes of partial felting unless the fibers be held to the surface of the cone by some means. The mode of working this branch of the combined process, which was adopted by the said WELLS, is as follows, viz.: So soon as a bat is formed the attendant takes from a kettle of hot water a piece of cloth, (felt cloth being best,) rolled upon a roller, and applies one end of it to the surface of the bat, and as the cone rotates the cloth winds from the roller onto the bat on the cone. This only covers the straight or conical part of the bat, but not the rounded tip, which, being generally the thinnest and most delicate, it is important to harden. This part of the bat is covered by another piece of cloth, and then a strong metallic cone, $k'$, Fig. 6, is put over the whole the more effectually to hold the fibers of the bat and to make a slight pressure on them, while the whole is immersed in hot water to harden or partially felt the bat by the circulation of the hot water through the apertures of the two cones and through the bat. As the perforated cone $o$ is better when made very thin, the pressure of the water when drawing it out of the kettle, after the bat has been hardened, tends to collapse it, and therefore, to prevent this, another perforated metallic cone, $t'''$, Fig. 7, may be put inside (before the whole is immersed in hot water) to sustain the pressure in drawing the whole out of the kettle. The relative situation of the three metallic cones, the bat and the covering of felt cloth, is represented on an enlarged scale at Fig. 8, which is a vertical section through the whole. The inner cone may be dispensed with if the cone $o$ be made of sufficient strength. By this mode of application of the second branch of the said process the pressure of the surrounding air for holding the fibers to the surface of the pervious cone can be suspended so soon as the bat is covered, so that the whole can be removed from the exhausting apparatus to be hardened while another hat is being formed on another cone.

Although the mode of application of the second branch of the said compound processes above described is deemed the best, I do not, however, wish to be understood as limiting the claim of invention to such mode of application, as the partial felting of the bat on the pervious cone may be effected by other and equivalent modes of felting, so long as the fibers constituting the bat are held to the surface of the cone by suitable pressure during the partial felting or hardening.

What I claim as the invention of the said HENRY A. WELLS is—

The combined process of forming fur hat-bodies by depositing fur fibers to a suitable thickness on the surface of a pervious former of the required shape, and holding them thereon by the pressure of the surrounding air as they are deposited, and then hardening or partially felting the bat so formed, and while it is held by suitable pressure onto the surface of the former to give it the required consistency to admit of removing it therefrom in a suitable condition for the after process of sizing by felting, as set forth.

H. A. BURR

Witnesses:

ANDREW DE LACY,
GEO. H. STREET.